June 6, 1972

J. M. BLUM ET AL

METHOD FOR ALLOYING METALS IN THE PRESENCE OF REACTIVE MATERIALS

Original Filed July 15, 1968

3,668,025

INVENTORS
JOSEPH M. BLUM
JAN P. HOEKSTRA

BY Thomas J. Kilgannon Jr.
ATTORNEY

United States Patent Office 3,668,025
Patented June 6, 1972

3,668,025

METHOD FOR ALLOYING METALS IN THE PRESENCE OF REACTIVE MATERIALS

Joseph M. Blum, Yorktown Heights, and Jan P. Hoekstra, Putnam Valley, N.Y., assignors to International Business Machines Corporation, Armonk, N.Y.

Continuation of abandoned application Ser. No. 745,009, July 15, 1968. This application May 6, 1971, Ser. No. 140,941

Int. Cl. H01l 7/46

U.S. Cl. 148—178 31 Claims

ABSTRACT OF THE DISCLOSURE

The invention involves a process for alloying a metal such as aluminum into a semiconductor such as germanium in the presence of reactive insulating material such as silicon dioxide. A layer of an organic material is deposited on the surface of the insulating material prior to alloying and heated for a time and temperature sufficient to leave a residue of the organic material at the surface of the insulating material. The organic material is removed by spraying with an organic solvent such as trichloro-ethylene while the materials are still hot. Alloying of the metal with the semiconductor is then carried out and any reaction between the aluminum and the silicon dioxide which might be expected to occur is minimized.

This is a continuation of application Ser. No. 745,009, filed July 15, 1968, now abandoned.

BACKGROUND OF THE INVENTION

Field of the invention

This invention relates generally to methods for alloying metals to other materials. More specifically, it relates to a method for alloying metals to semiconductors in the presence of materials which react with the metals and to a method for eliminating or severely limiting such reaction.

Description of the prior art

Alloying of metals with semiconductors has been known for many years particularly in the area of ohmic contact formation and the prior art shows many techniques for such alloying. The prior art has also recognized that when alloying metals such as aluminum into semiconductors in the presence of insulating materials such as silicon dioxide, a reaction takes place between the aluminum and the oxide resulting in deleterious deposits in the metal which detract from the ability of the metal to act as a good conductor and which adhere to the underlying semiconductor. The prior art, while recognizing the reactivity problem uses various expedients to overcome the problem uses various expedients to overcome the problem. In one instance, the affinity of aluminum for oxygen results in the formation of an oxide on the surface of an aluminum contact during an alloying step. The oxide is allowed to form, but it is then removed by etching and immediately plated with a protective coating. The prior art apparently has not proposed a direct solution to the prevention of the oxide forming reaction between aluminum and silicon dioxide in environments where the formed oxide cannot be removed after formation. One prior art technique avoids the problem by heating to the semiconductor aluminum eutectic temperature to alloy the aluminum to the semiconductor. The reaction between aluminum and silicon dioxide does not take place at any appreciable rate at the eutectic alloying temperatures but occurs rather rapidly when temperature exceeding the melting point of aluminum (660° C.) are reached. In circumstances where the melting point of the metal must be reached to obtain desired semiconductor characteristics and structures, the problem of the reaction between metals such as aluminum and silicon dioxide has not been satisfactorily dealt with by the prior art.

SUMMARY OF THE INVENTION

The mothod of the present invention, in its broadest aspect, comprises the step of forming a reaction barrier layer at the surface of a reactive protective layer which is disposed on the surface of a substrate to limit the reaction between a metal, which is being alloyed into the substrate and the reactive protective layer. The reaction barrier layer is formed from an organic material which upon heating and removal by spraying with a suitable solvent leaves a residue at the surface of the reactive layer which is disposed on the substrate surface. After removal of the organic material, the metal to be alloyed into the semiconductor is subjected to a temperature sufficient to alloy the metal with the substrate and also to obtain significant diffusion of the metal into a portion of the substrate not dissolved in the metal.

In accordance with a more particular aspect of the invention, a silicon oxide coated wafer of a semiconductor such as germanium is provided with an opening in the oxide and a metal such as aluminum is deposited in and limited to the opening. A coating of an organic material such as a photoresist, KMER or KTFR, products of Eastman Kodak Co., for example, is disposed on the surface of the oxide. The photoresist material is then heated to a temperature of 300° C. for approximately 5 seconds by heating the semiconductor substrate on a hot plate. Immediately thereafter, the substrate is removed from the hot plate and the heated photoresist is sprayed with a solvent such as trichloro-ethylene causing the photoresist to blister and peel from the surface of the protective oxide leaving a residue at the surface of the oxide. Upon heating to alloy the aluminum with the germanium at a temperature of approximately 700° C., the aluminum alloys with the germanium and simultaneously begins to diffuse from the germanium metal melt into the semiconductor with little or no reaction occurring between the aluminum and the protective oxide, silicon dioxide. The resulting alloyed and diffused aluminum region is substantially free of deleterious oxide formation and forms a region of a semiconductor device which can be, for example, a transistor. A subsequent heat treatment in an oxidizing atmosphere removes the residue.

It is, therefore, an object of this invention to provide a method for alloying a metal or alloy thereof which is reactive at alloying temperature with an oxide containing material into a semiconductor with substantially no reaction between the metal and the oxide containing material.

Another object is to provide a method for alloying a metal or alloy thereof into a semiconductor in the prence of silicon dioxide which results in integrated circuit devices having improved characteristics.

Still another object is to provide a method for post-alloy diffustion of aluminum alloys into semiconductors which is adapted to the manufacture of integrated circuits.

The foregoing and other objects, features, and advantages of the invention will be apparent from the following more particular description of preferred embodiments of the invention as illustrated in the accompanying drawings.

DESCRIPTION OF THE PREFERRED EMBODIMENT

Before proceeding with the description of the preferred embodiment, it should be appreciated that the method utilized has been incorporated into the manufacture of semiconductor integrated circuits because it permits the use of materials which have desirable characteristics such as good conductivity, good adhesion of the oxide used to semiconductors, good adhesion between metalization and the oxide, and good electrical properties when an aluminum alloy is alloyed into the semiconductor. These characteristics are present to an extent not present in other combinations of materials and, in spite of the fact that a reaction problem exists between the metal (aluminum) alloy and the protective oxide (silicon dioxide) their use has remained the preferred approach. The use of these materials in the integrated circuit environment has become even more attractive now that the reaction problem between the metal and the oxide has been solved.

It should also be appreciated at the outset that while the application being taught relates to an integrated circuit environment, it is not limited to such an environment but may be utilized in any situation where the reaction between a metal and an oxide containing material or other substance reactive with a metal is a problem.

Figures 1, 2, 3, 4, 4A, 4B, 5, 6:
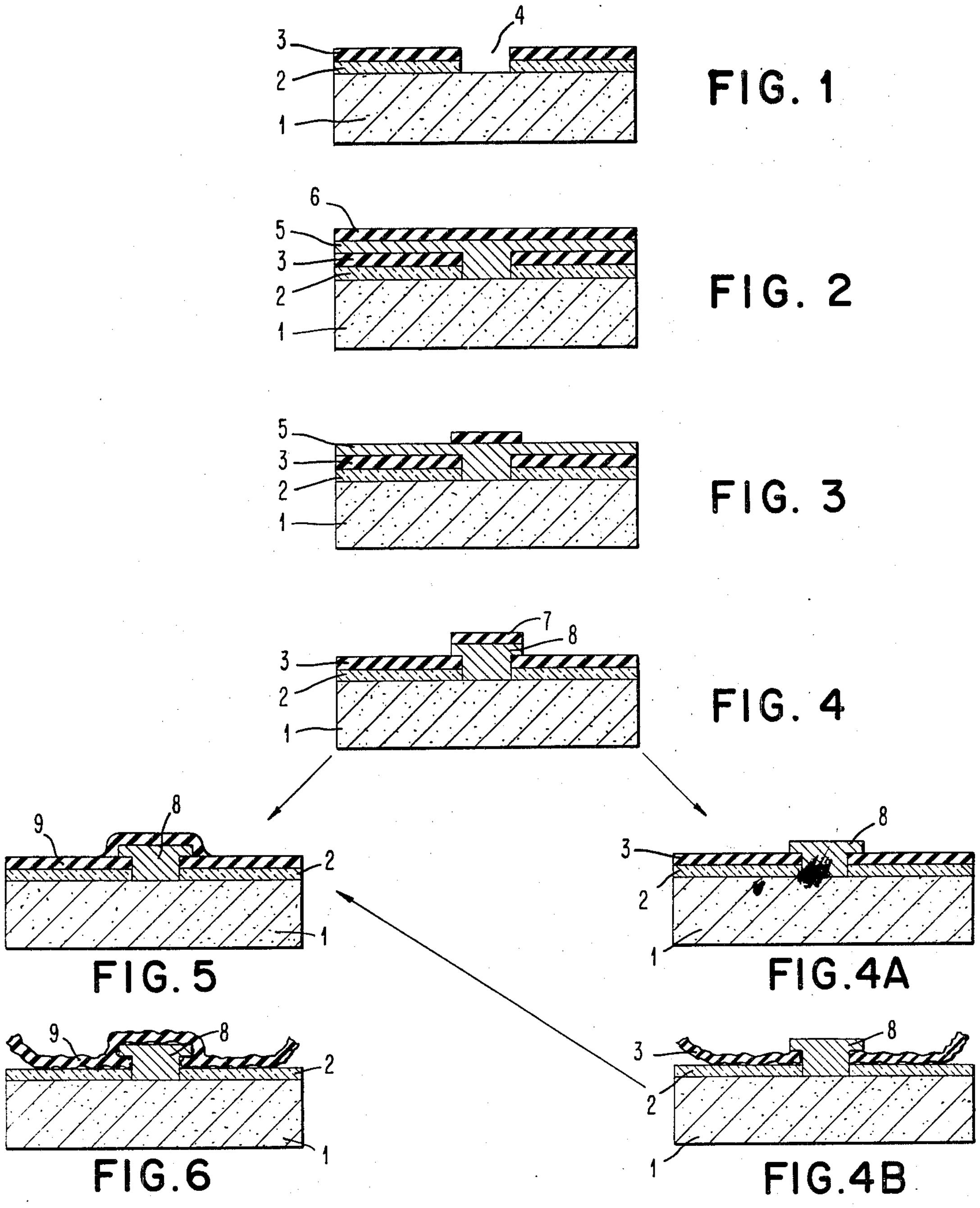
FIGS. 1, 2, 3 and 4 are partial cross-sectional views of a substrate illustrating the initial steps in the process of the invention including the formation of an opening in an oxide, and the deposition and delineation of metallization in the opening.
FIGS. 4A and 4B are views similar to FIGS. 1 through 4 illustrating additional steps which must be taken when the initially deposited material is KTFR or KMER.
FIGS. 5, 6, and 7 are views similar to FIGS. 1 through 4 illustrating the preferred steps along with FIGS. 1 through 4 when the first and second photoresists are photoresists other than KTFR or KMER.

In accordance with preferred method steps, a semiconductor substrate 1 is shown in FIG. 1 with a layer 2 of an oxide containing material such as silicon dioxide disposed on its upper surface. A layer 3 of photoresist, preferably a positive photoresist having an opening 4 therein is shown disposed on the surface of layer 2. The photoresist used may be anyone well known to those skilled in the photolithographic art. A number of such positive resists are commercially available. A positive resist is one in which the portions of the resist which are not exposed to a light source after development remain, while the exposed portions are dissolved away. A negative resist, on the other hand, behaves in the opposite manner. The unexposed portions of the negative resist, after development of a desired image, are dissolved away. Layer 3 is applied by a well-known spinning and drying technique. Thus, in FIG. 1 a portion of the photoresist layer 3 is exposed by a mask to a light source (not shown) and, upon development, that portion is removed resulting in opening 4. A suitable etchant for the silicon dioxide such as buffered hydrogen fluoride is applied to the unmasked surface of the silicon dioxide removing the unmasked oxide portion and extending opening 4 to the surface of semiconductor wafer 1.

In FIG. 2, a layer 5 of metal, preferably aluminum or an aluminum alloy is deposited on the upper surface of photoresist layer 3 and into opening 4. The metal may be deposited by any well-known technique such as evaporation or sputtering. A second layer 6 of photoresist similar to layer 3 is applied to the surface of layer 5 in the same manner layer 3 was applied.

Photoresist layer 6 is exposed through an appropriate mask such that upon development only portion 7 in FIG. 3 remains. Since the developed photoresist is etch resistant, portion 7 acts as a mask when a suitable etch for the aluminum or aluminum alloy of layer 5 is applied to layer 5. Etchants such as those containing $HNO_3$ and $H_3PO_4$ may be used to etch away all other portions of layer 5 except that portion which is masked or delineated by portion 7 of layer 6.

The metallization portion 8 remaining after etching is shown in FIG. 4 with etch resistant portion 7 of layer 6 disposed on the surface thereof.

In the preferred approach to the method of this invention, portion 7 and layer 3 are completely removed by applying a suitable solvent such as acetone well known to those in the photolithographic art. In a preferred step as shown in FIG. 5, a layer of photoresist is applied so that it completely covers the surface of silicon dioxide layer 2 and metallization portion 8. Layer 9 is preferably KMER or KTFR. Other organic compounds similar in chemical make-up to the above identified photoresists, may also be used.

After layer 9 has been spun and dried, semi-conductor substrate 1 is placed on a hot plate and heated for a time and at a temperature sufficient to cure the photoresist but not so long that the photoresist burns or chars. The heating should be applied for a length of time so that in the subsequent step the photoresist layer peels off smoothly rather than generating a plurality of perforated blisters, portions of which adhere to the oxide layer. If heating causes charring, the resist adheres to the surface of layer 2 and is practically impossible to remove by conventional techniques. Heating to 300° C. for about 5 seconds on a hot plate produces the desired result when the next succeeding step in the method is used.

Immediately upon removing substrate 1 from the hot plate or other suitable heating means layer 9 is sprayed with trichloroethylene or other suitable solvent so that layer 9 blisters and peels away from the surface of layer 2 and metallization portion 8. The "blister-peeling" is illustrated in FIG. 6 by showing layer 9 having a crinkled appearance. In actuality, layer 9 lifts from the surface of layer 2 and is dissolved and stripped away by the trichloroethylene solvent.

Figure 7:
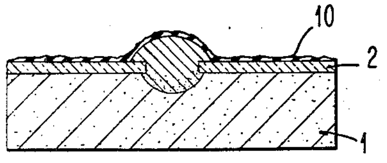

The removal of layer 9 by the heating and spraying steps defined above leaves a residue at the surface of layer 2 and portions of this residue may be both on and in the surface of silicon dioxide layer 2. This residue is shown at 10 in FIG. 7. In FIG. 7, metallization portion 8 and substrate 1 have been exposed to temperatures above the melting point of portion 8. In the instance of aluminum which has a melting point of 660° C., the temperature utilized is 700° C.

It is at this point that one would normally expect a reaction to occur between the metallization portion 8 of aluminum and that portion of layer 2 which comes in contact with the aluminum during alloying at 700° C. Unexpectedly, no reaction or at most an extremely slight reaction takes place between the aluminum and the silicon dioxide. Thus, residue 10 at the surface of layer 2 acts as a barrier layer to prevent any reaction between the aluminum and the silicon dioxide. It should be appreciated that if the amount of resist residue is excessive that subsequent residue removal operations will be unsuccessful causing poor adhesion of interconnection metallurgy to the oxide.

As has been indicated hereinabove, there are situations where the melting temperature of the metal or alloy thereof must be used; for if one simply wished to alloy, the eutectic temperature of the metal semiconductor could be used and the reaction between the metal and silicon dioxide could be avoided since such reaction does not occur appreciably at the eutectic temperature of aluminum and silicon (577° C.) for example. One situation where the temperature must be elevated to the melting point and beyond of a metal such as aluminum is when a post alloy diffusion step is contemplated. The technique of post alloy diffusion is utilized in the manufacture of integrated circuits to provide extremely small emitters with extremely small active base regions.

Final removal of resist residue can be accomplished by heat treatment in an oxidizing atmosphere. For example, heating substrate 1 at 400° C., in air, for 10 minutes provides a clean surface suitable for further processing. It should be appreciated that the residue removal is only necessary where it is desired to achieve good adherence of subsequent metallization to the surface of the oxide such as in the manufacture of integrated circuit devices.

In the post alloy diffusion technique, aluminum alloys of aluminum, gallium and antimony have been found to be useful. In alloying, the temperature is maintained above the melting point of aluminum, dropped approximately 10 degrees and held at the lower temperature for a time sufficient to permit a fast diffusing dopant such as antimony to diffuse to a desired depth. Any other temperatures lower than the melting point of the aluminum would require unreasonable diffusion times. In addition to preventing a reaction between the metal and the oxide during alloying, the method also limits the area in which alloying takes place thereby permitting alloying to particular and extremely small areas.

Referring again to the drawings and particularly FIG. 4, it should be recalled that photoresist layer 3 was previously identified as a positive photoresist in the preferred method. The present invention may also be utilized where layer 3 consists of either KMER or KTFR or other similar material. Under such circumstances portion 7 of photoresist layer 6 only is removed by well-known techniques resulting in the arrangement shown in FIG. 4A. At this point, substrate 1 is subjected to a temperature of 300° C. for 5 seconds on a hot plate (curing will not take place at lower temperatures) and, upon removal from the hot plate, is sprayed with trichloroethylene to "blister-peel" layer 3 from the surface of silicon dioxide layer 2 as shown in FIG. 4B.

The surface of layer 2 is then recoated with a layer 9 of KTFR or KMFR or other similar material and dried resulting in the arrangement shown in FIG. 5. The steps of the method are then carried out in the same manner as described previously in connection with FIGS. 5, 6 and 7.

The approach just described, while somewhat more lengthy, provides the same results while requiring the use of only one type of photoresist.

The various layers shown in the drawings can be found in most integrated circuit and transistor structures. Depending on the size and the results sought the layers may have certain thicknesses but these thicknesses are not critical.

Substrate 1 has been characterized previously as a semiconductor. Semiconductors such as silicon, germanium and gallium arsenide are examples of useful semiconductors. The substrate material is not critical and in fact could be any material into which it is possible to alloy a metal. What makes the practice of the present invention necessary is the requirement that alloying at or above the melting point of the alloying metal be carried out in the presence of an oxide or other substance which is reactive with the metal.

In keeping with the foregoing statement it should be appreciated that, while metals and alloys thereof having an affinity for oxygen have been described in connection with a particular example, the present invention is not so limited but may also be used in alloying of metals and their alloys to substrates in the presence of materials containing substances different from oxygen, such as sulphur and nitrogen, which are also reactive with the metallic material being used at the alloying temperatures of the metallic materials.

Other examples of metals which react with silicon oxide are titanium, magnesium and zirconium. In fact, any metal or metal alloy which has an affinity for oxygen or other substance reactive with the metal can be utilized thereby extending the choice of metals where previously one would be limited to nonreacting metals. Where these metals or alloys thereof are alloyed into a substrate a residue of photoresist obtained by the "blister-peeling" of KTFR, KMER or other similar material at the surface of the silicon dioxide or other reactive substance will prevent or severely limit any reaction between the oxide and the above mentioned metals or their alloys.

No. 75445 Rampmeyer, C. M. 5-11-72 Day Mach. 58

It should also be appreciated that the technique is not limited to insulating films of silicon dioxide. Any material containing an excess of oxygen will show a reaction with metals or alloys which react with oxygen. Thus, pyrolytic aluminum oxide reacts with aluminum, for example. Reactions may also be expected between a metal and an alloy thereof and composite films containing oxygen, such as aluminum and silicon oxy-nitrides. In general, it may be said that any material containing an excess of oxygen or other substance reactive with metals which does not decompose at the alloying temperatures, will react with the alloying metal and the technique of the present invention prevents or severely limits such reactions.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method for alloying a first material exhibiting metallic properties to a portion of a second material wherein said second material is covered, except at said portion, with a coating which is reactive with said first material at the alloying temperature comprising the steps of:

- forming a layer of organic film on said coating;
- contacting said second material and said coating with said first material;
- curing said organic film by heating said film at a first temperature and for a time interval sufficiently small to prevent charring of said organic film;
- removing said heat from said cured organic film;
- removing said cured organic film from said coating to leave a residue of said cured film on said coating, said residue inhibiting reaction between said first material and said coating during alloying of said first and second materials; and
- alloying said second material with said first material by heating said second material to a second temperature sufficient to alloy said first material to said portion of said second material.

2. A method according to claim 1 wherein said coating is one selected from the group consisting of oxygen, sulfur, and nitrogen containing materials and mixtures thereof.

3. A method according to claim 1 wherein said first material is selected from the group consisting of Al, Ti, Mg, Zr, and alloys thereof.

4. A method according to claim 1 wherein said second material is a semiconductor.

5. A method according to claim 1 wherein said coating is selected from the group consisting of metal oxides and metal oxy-nitrides.

6. A method according to claim 1 wherein said organic film is an organic photoresist.

7. A method according to claim 4 wherein said semiconductor is one selected from the group consisting of germanium, silicon, and gallium arsenide.

8. A method according to claim 1 wherein said second temperature is above the melting point of said first material.

9. A method according to claim 1 further including the steps of:

- cooling said second material below said second temperature to permit recrystallization of a portion of said alloyed material and,
- heating said second material for a time sufficient to diffuse a portion of said first material into said second material.

10. A method according to claim 1 wherein the step of removing said organic film includes the step of: spraying said film with a solvent to cause said film to blister and peel from the surface of said coating leaving a residue from said film.

11. A method according to claim 2 wherein said coating is an oxide selected from the group consisting of silicon dioxide, aluminum oxide, and mixtures thereof.

12. A method according to claim 2 wherein said coating is an oxy-nitride selected from the group consisting of silicon oxy-nitride and aluminum oxy-nitride.

13. A method according to claim 3 wherein said alloy contains donor and acceptor impurities.

14. A method according to claim 1 wherein said curing step is carried out at a first temperature of 300° C. for 5 seconds.

15. A method according to claim 10 wherein said solvent is trichloroethylene.

16. A method for alloying a first material exhibiting metallic properties to a portion of a second material wherein said second material is covered, except at said portion, with a coating which is reactive with said first material at the alloying temperature, comprising the steps of:

forming a layer of organic film on said coating;

curing said organic film by heating said film at a first temperature and for a time interval sufficiently small to prevent charring of said organic film;

removing said heat from said cured organic film;

removing said cured organic film from said coating to leave a residue of said cured film on said coating, said residue inhibiting reaction between said first material and said coating during alloying of said first and second materials;

contacting said second material and said coating with said first material; and alloying said second material with said first material by heating said second material to a second temperature to alloy said first material to said portion of said second material.

17. The method of claim 16 wherein said coating is selected from the group consisting of oxygen, sulphur, and nitrogen containing materials and mixtures thereof.

18. The method of claim 16 wherein said first material is selected from the group consisting of Al, Ti, Mg, Zr, and alloys thereof.

19. The method of claim 16, wherein said second material is a semiconductor.

20. The method of claim 16, wherein said second temperature is sufficient to melt said first material.

21. The method of claim 16, further including the steps of:

cooling said second material below said second temperature to permit recrystallization of a portion of said alloyed material and, heating said second material for a time sufficient to cause at least a portion of said first material to diffuse into said second material.

22. The method of claim 16, wherein the step of removing said organic film comprises spraying said film with a solvent to cause said film to blister and peel from the surface of said coating leaving a residue of said film.

23. The method of claim 18, wherein said alloy contains donor and acceptor impurities.

24. The method of claim 16, wherein said organic film is an organic photoresist.

25. A method of alloying a first material exhibiting metallic properties to a portion of a second material, wherein said second material has a coating thereon except in said portion, said coating reacting with said first material during alloying of said first and second materials at temperatures sufficient to melt said first material, comprising the steps of:

forming an organic layer on said coating;

contacting said second material and said coating with said first material;

curing said organic layer by heating said layer at a first temperature and for a time interval sufficiently small to prevent charring of said organic layer, said cured organic layer inhibiting reaction between said first material and said coating during alloying of said first and second material;

alloying said first material to a portion of said second material by heating said second material to a temperature sufficient to melt said first material.

26. The method of claim 25, wherein said coating is selected from the group consisting of oxygen, sulfur, and nitrogen containing materials and mixtures thereof.

27. The method of claim 25, wherein said first material is selected from the group consisting of Al, Ti, Mg, Zr, and alloys thereof.

28. The method of claim 25, wherein said second material is a semiconductor.

29. The method of claim 25, wherein said organic layer is an organic photoresist.

30. The method of claim 25, further including the steps of:

cooling said second material below said second temperature to permit recrystallization of a portion of said alloyed material, and heating said second material for a time sufficient to cause a portion of said first material to diffuse into said second material.

31. The method of claim 27, where said alloy contains donor and acceptor impurities.

References Cited

UNITED STATES PATENTS

| | | | |
|---|---|---|---|
| 3,341,377 | 9/1967 | Wacker | 148—179 |
| 3,510,368 | 5/1970 | Hahn | 148—179 |

FOREIGN PATENTS

| | | |
|---|---|---|
| 1,070,303 | 6/1967 | Great Britain. |

RICHARD O. DEAN, Primary Examiner

U.S. Cl. X.R.

148—1.5, 33.3, 179, 180, 182, 185